Nov. 22, 1927.  
O. E. GARDNER  
SAWYER'S GAUGE  
Filed April 30, 1927  
1,649,955
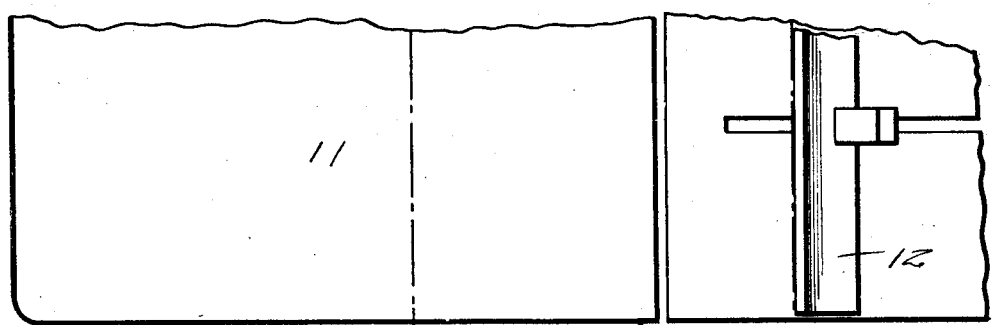
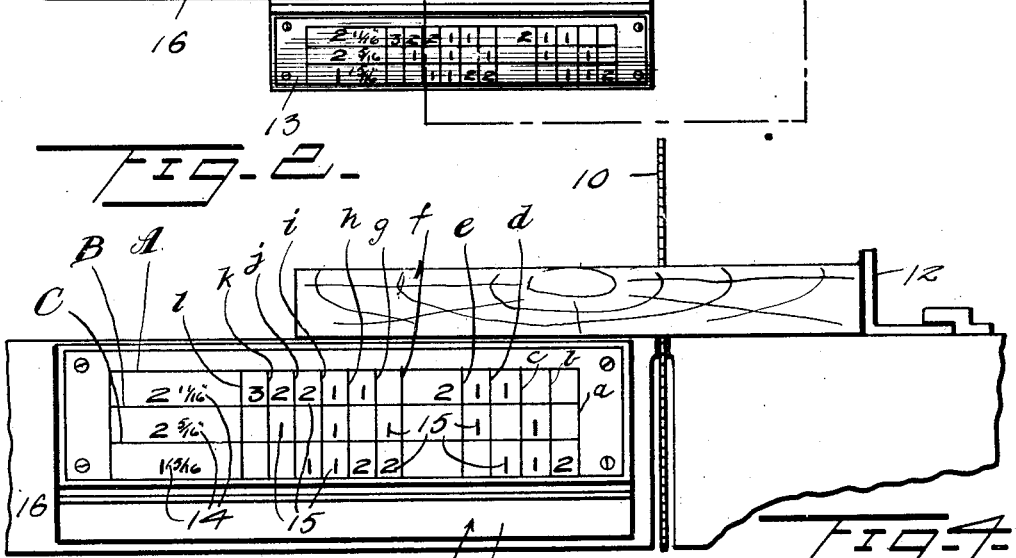
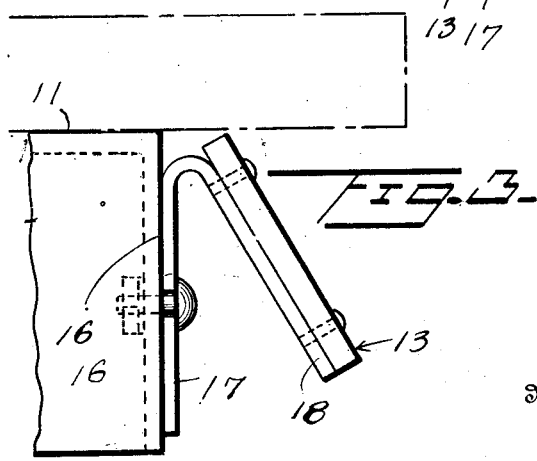
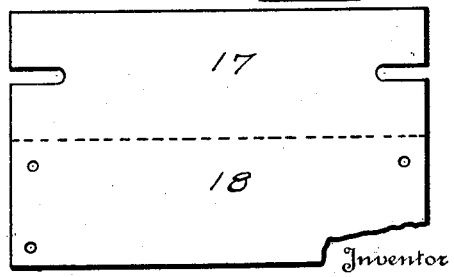
Inventor  
O. E. Gardner  
By Watson E. Coleman  
Attorney Patented Nov. 22, 1927.

1,649,955

UNITED STATES PATENT OFFICE.

OSCAR E. GARDNER, OF SHREVEPORT, LOUISIANA, ASSIGNOR TO ARKANSAS OAK FLOORING COMPANY, OF PINE BLUFF, ARKANSAS, A CORPORATION OF ARKANSAS, AND ARKANSAS OAK FLOORING COMPANY, INC., OF ALEXANDRIA, LOUISIANA, A CORPORATION OF LOUISIANA.

SAWYER'S GAUGE.

Application filed April 30, 1927. Serial No. 187,951.

This invention relates to sawyers' gauges and more particularly to a device adapted for attachment to the table of a power saw, which will enable the sawyer to tell at a glance just how many boards of desired widths may be secured from a piece.

In the production of fine hardwood flooring, three different standard sizes or widths are employed, these widths being two and eleven-sixteenths inches, two and five-sixteenths inches and one and fifteen-sixteenths inches, respectively. The boards from which the flooring is produced come in different widths and economical production commands that these boards be sawed to produce the maximum number of flooring boards with a minimum waste. Due to the irregular sizing of the flooring, it is difficult to rapidly determine just exactly how many boards may be obtained and what width these boards should be. Accordingly, an important object of this invention is to provide a device co-operating with a gauge which engages one side of the board which has a scale indicating immediately the number of flooring boards which may be produced from a piece of stock and the width of these boards. Such a device as will, for example, indicate immediately that from a board slightly less than eight inches in width, two floor boards of two and eleven-sixteenths inches and one floor board of one and fifteen-sixteenths inches may be produced with a minimum loss of material from the stock.

A further object of the invention is to produce a device of this character which may employ as one of its parts the guide ordinarily employed with saw tables to guide the stock into position against the saw, when this guide is set so that a piece of stock guided thereby against the saw will have ripped therefrom a piece of material of the proper size for the production of one, preferably the widest, of the floor boards.

These and other objects I attain by the construction shown in the accompanying drawings, wherein for the purpose of illustration is shown a preferred embodiment of my invention and wherein:—

Figure 1 is a plan view of a saw table having a gauge constructed in accordance with my invention;

Figure 2 is an edge elevation thereof;

Figure 3 is a side elevation showing a gauge attached;

Figure 4 is a plan of the sheet from which the bracket is produced.

Referring now more particularly to the drawings, the numeral 10 generally designates a rip saw, 11 a table for supporting stock to be cut by the saw and 12 a guide carried by the table and adjustable toward and away from the saw to determine the width of the piece ripped from the stock by the saw. In the present instance, the flooring boards to be produced are in three standard sizes of two and eleven-sixteenths, two and five-sixteenths and one and fifteen-sixteenths inches, as set forth above. It will, of course, be understood that the pieces ripped from the stock for the production of these boards must necessarily be slightly wider to allow for finishing and rabbeting of the edges thereof. A flooring board, two and eleven-sixteenths inches in width, for example, is produced from a strip two and thirteen-sixteenths inches wide, which is cut from the stock and the proportion of the allowance is made in the production of the other sizes of material.

In the use of my invention, the saw guide 12 is adjusted so that a piece of stock of the proper size to form a floor board will be cut if a piece of stock is fed thereagainst to the saw. This is preferably the widest piece of stock which is to be produced, for a reason which will hereinafter appear, and accordingly the setting of the gauge in accordance with my invention and with the present sizes of finished stock which will be produced would be two and thirteen-sixteenths inches from the saw.

In accordance with my invention, I provide a plate 13, which is adapted to be secured to the table, in such a position that indicia carried by the face thereof may be readily observed by a sawyer feeding boards to the table. This plate has formed thereon a plurality of parallel lines, designated by characters *a* to *l* respectively, which parallel the guiding face of the gauge 12 when the gauge plate 13 is in applied position, the line *a* being the nearest to the gauge. These lines are intersected by parallel lines A, B and C and the lines A, B and C have each associated therewith the numerals 14 giving the size of the board width referred to. In certain of the blocks produced by intersection of the lines $a$ to $l$ with the lines A, B and C, indicia 15 are provided forming an indication of the number of boards of the desired widths, which can be produced with the least loss of stock. If, for example, the board applied to the gauge, as indicated in construction lines in Figure 1, has its outer edge lying between the lines $i$ and $j$, the indicia between these lines provides the indication of the number of boards and their sizes which can be produced from the piece of stock. Thus, two pieces of two and eleven-sixteenths inches of stock may be produced and one piece of one and fifteen-sixteenths inches material. A board of this size would be slightly less than eight inches in width. In laying out the lines $a$ to $l$, care must be taken to allow for stock removed by the saw as well as the excess width necessary for finishing. The plate 13 is secured in fixed relation to the saw and preferably to the edge 16 of the table, so that the line $a$ is a predetermined distance from the guiding face of the saw guide.

In the present instance, I have disclosed this plate as secured to the bracket formed by bending a sheet intermediate its edges to provide a table engaging arm 17 and plate receiving arm 18, which are at an acute angle to one another, so that the plate, when applied thereto, faces outwardly and upwardly from the edge of the saw table and is so arranged that it will not interfere with the application of boards to the table.

Since the construction hereinbefore set forth is capable of a certain range of change and modification without materially departing from the spirit of the invention, I do not limit myself to such specific structure except as hereinafter claimed.

I claim:—

1. Apparatus for determining the numbers and kinds of finished boards of a series of desired widths which may be obtained with the least loss of stock in ripping a stock board comprising a guide against which one edge of the stock board may be arranged and a gauge element associated with the guide to extend transversely of a board so placed, said gauge element being provided with spaced lines paralleling the guide and indicia associated with each pair of adjacent lines for indicating the number and size of finished boards of desired size which may be secured from a stock board which having one edge disposed against the guide while in said position has its opposite edge between adjacent lines of the gauge element.

2. Apparatus for determining the numbers and kinds of finished boards of a series of desired widths which may be obtained with the least loss of stock in ripping a stock board comprising a guide against which one edge of the stock board may be arranged and a gauge element associated with the guide to extend transversely of a board so placed, said gauge element being provided with transversely extending spaced lines paralleling the guide and at the end thereof remote from the guide having transversely spaced indicia corresponding to the board sizes to be produced, the gauge being provided with further indicia arranged between each pair of adjacent lines and aligning with the first named indicia to indicate the number of boards of that size which may be produced from a stock board which having one edge disposed against the guide has its opposite edge arranged between adjacent lines of the gauge element.

3. In combination with rip sawing apparatus including the usual saw, supporting table and guide adjustable upon the table toward and away from the saw, a gauge secured to the table at the opposite side of the guide from the saw and having indicia which in one position of said guide indicate the number of finished boards of desired widths which may be produced by a stock board one edge of which is engaged against the guide, said gauge having means coacting with the opposite edge of the board to assist in the selection of the proper indicia.

In testimony whereof I hereunto affix my signature.

OSCAR E. GARDNER.